No. 867,421. PATENTED OCT. 1, 1907.
E. P. ROSS.
MANURE SPREADER.
APPLICATION FILED MAR. 19, 1906.
3 SHEETS—SHEET 3.
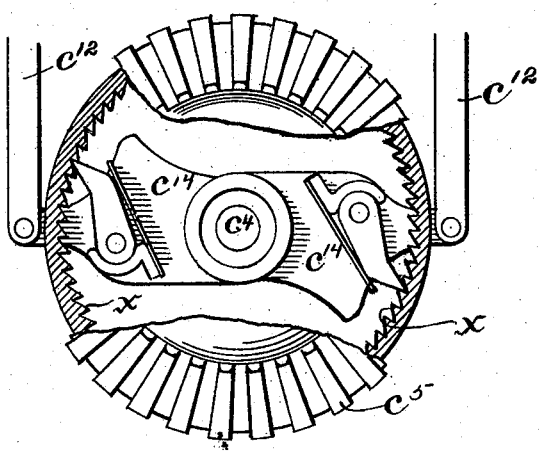
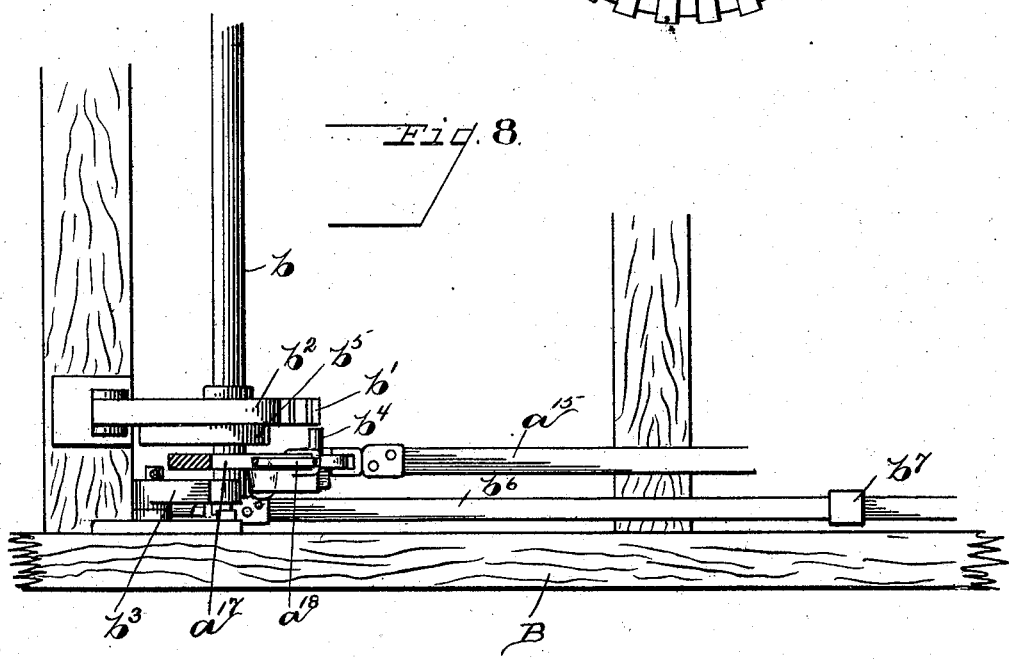

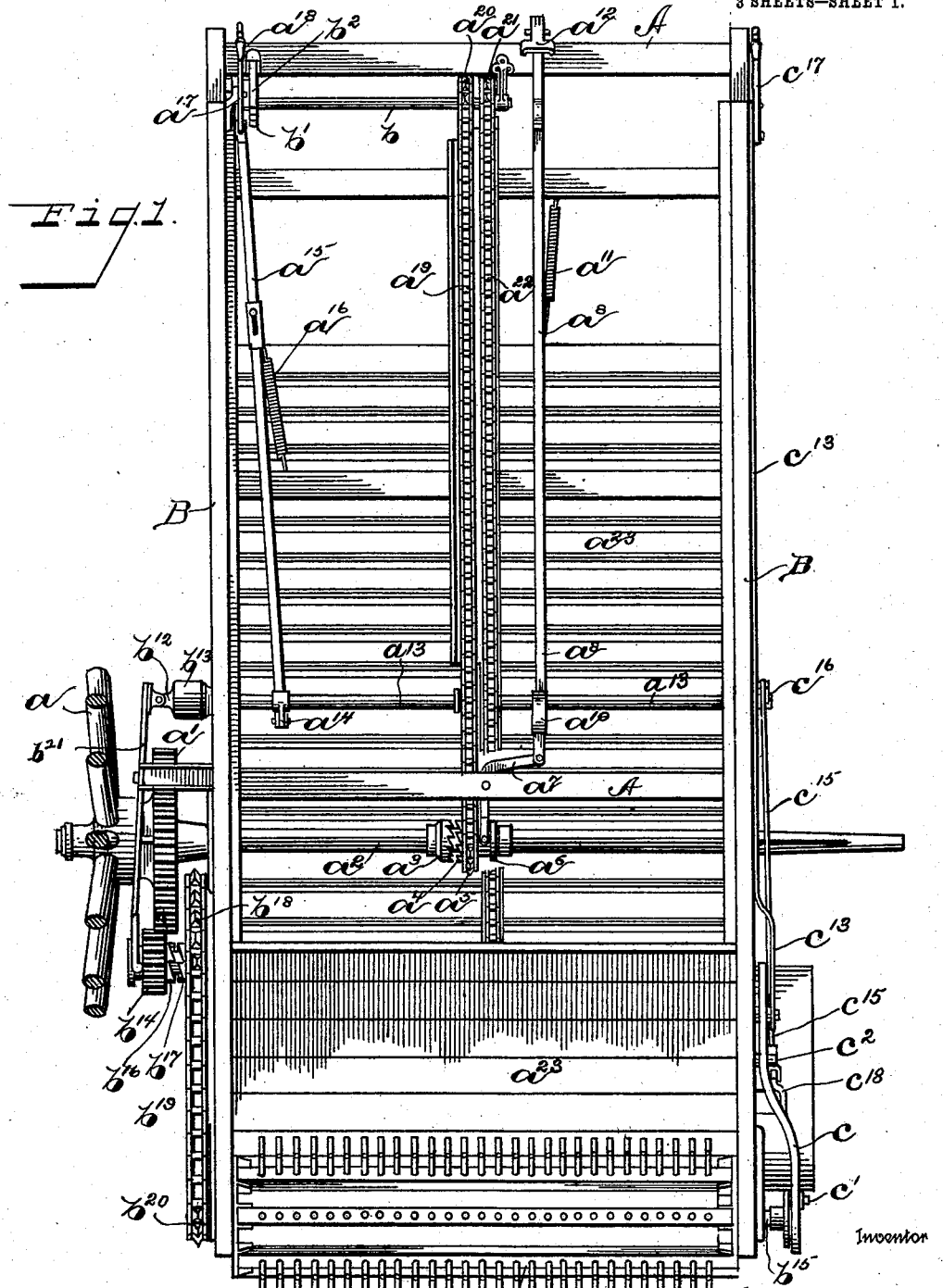

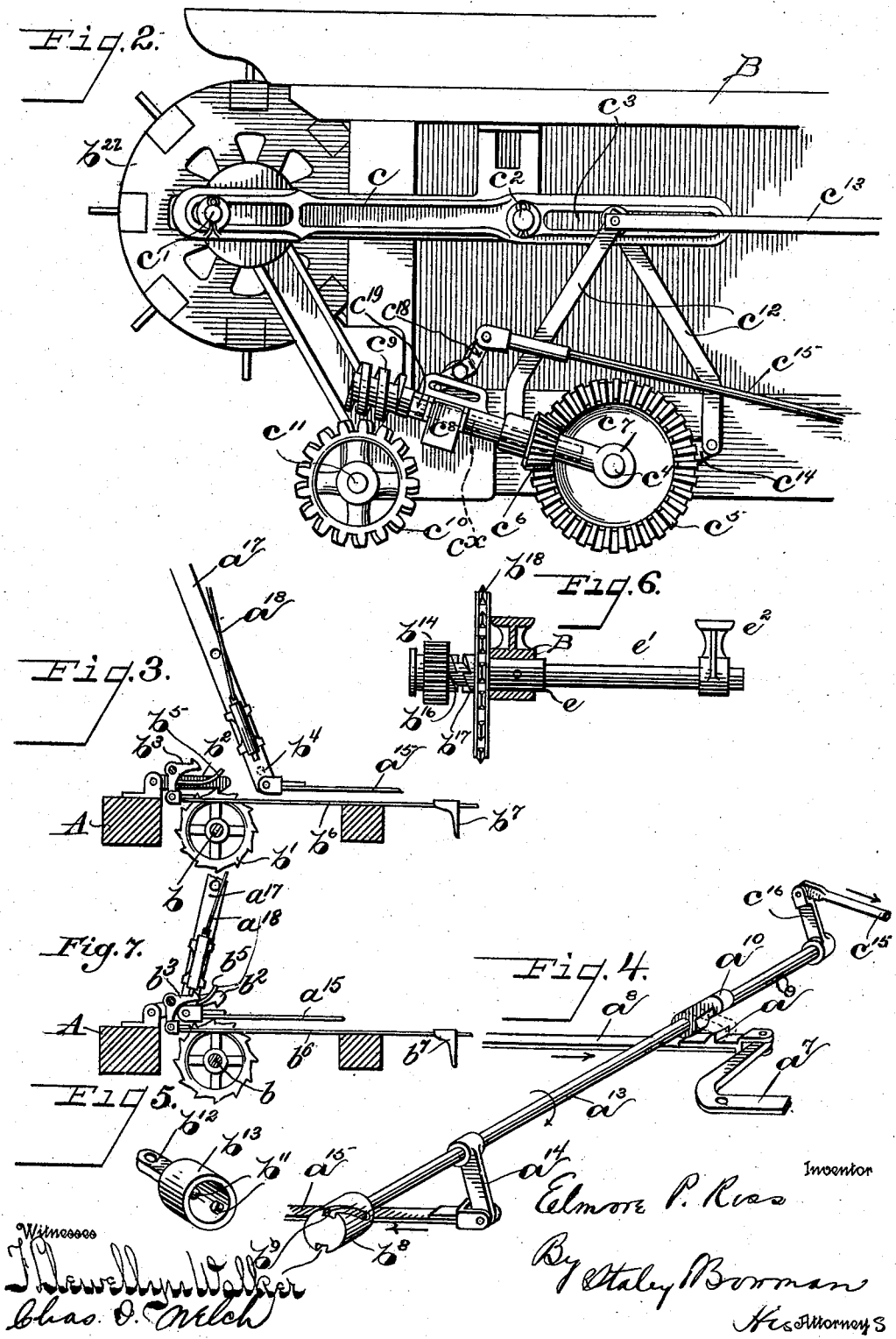

UNITED STATES PATENT OFFICE.

ELMORE P. ROSS, OF SPRINGFIELD, OHIO, ASSIGNOR TO THE E. W. ROSS COMPANY, OF SPRINGFIELD, OHIO, A CORPORATION OF OHIO.

MANURE-SPREADER.

No. 867,421.  Specification of Letters Patent.  Patented Oct. 1, 1907.

Application filed March 19, 1906. Serial No. 306,777.

*To all whom it may concern:*

Be it known that I, ELMORE P. ROSS, a citizen of the United States, residing at Springfield, in the county of Clark and State of Ohio, have invented certain new and useful Improvements in Manure-Spreaders, of which the following is a specification.

My invention relates to a manure spreader.

The object of my invention is to construct a machine which shall be compact, having as few parts as possible, and protecting those parts from injury so far as possible.

In machines of this character there has been considerable trouble from breakage of the parts, and this has been partly due to the amount of mechanism that has been used in the machine, and partly due to the fact that a part of the mechanism necessarily must extend from the extreme front of the machine to the extreme rear of the machine, the driver being located at the front of the machine, and the beater mechanism necessarily located at the extreme rear of the machine.

By my improved construction I have a machine which is extremely compact, simple in its construction and protected to a great extent against careless operation.

In the drawings, Figure 1 is a plan view of the machine, one of the carrying wheels being shown partly in section. Fig. 2 is a side view of the beater and connecting gears with the casing for said gears removed. Fig. 3 is a detail view of the means for locking the web in its normal position. Figs. 4 and 5 are detail views of the locking mechanism for one of the controlling levers and connections thereto. Fig. 6 is a detail view of the clutch member connected with the beater. Fig. 7 is a detail view showing the lever, $a^7$, locked in its advanced position. Fig. 8 is a plan view of the pawl, ratchet and hand lever mechanism, parts thereof being shown in section. Fig. 9 is a detail view of the pawl-ratchet mechanism located between the beater mechanism and the web.

Like parts are indicated by similar characters of reference throughout the several views.

The frame of the machine is indicated by A B, and on the left hand side is shown the carrying wheel (looking at Fig. 1) partly in section, and is marked with reference letter $a$. This carrying wheel is located near the rear of the machine and constitutes the main operating device for the mechanism. A gear, $a^1$, is formed integral with the hub of this carrying wheel, and the carrying wheel shaft, $a^2$, is loosely mounted in bearings on the frame B B, so that the shaft will rotate in unison with the carrying wheel. Near the center of this shaft there is secured a clutch, $a^3$, which with its opposing clutch member, $a^4$, constitutes one set of the driven gear of this machine. This opposing clutch member, $a^4$, is loosely mounted on said carrying wheel shaft and is formed integral with the sprocket wheel $a^5$. There is also formed integral with said sprocket wheel and clutch member, $a^4$, a sleeve, $a^6$, which constitutes part of said movable clutch member. A shifter, $a^7$, is formed with the usual stirrup to engage the sleeve of the clutch member $a^4$. At the free end of said shifter there is pivoted a connecting rod, $a^8$, slidingly mounted on the frame of the machine, and this connecting rod is part of the controlling mechanism for the clutch members. There is formed on the sliding rod, $a$, a projection, $a^9$, (see Fig. 4) which is adapted at predetermined 65 times to be engaged by the hook, $a^{10}$, as will be explained more fully hereafter. The hook, $a^{10}$, in coöperation with the lug, $a^9$, acts as a lock at predetermined periods of time to hold the rod and shifter against movement, and thereby control the engagement of the clutch members. A spring, $a^{11}$, (see Fig. 1) normally holds the clutch member, $a^4$, out of mesh with its coöperating member, $a^3$.

The foot lever, $a^{12}$, of the ordinary and usual kind, operates to slide the connecting rod, $a^8$, backward and forward for engaging and disengaging the clutch members. This foot lever is shown at the extreme front of the machine in the usual position where the operator can easily manipulate same. When the operator presses the foot lever, $a^{12}$, the driven gear comprising the clutch members, $a^3$ $a^4$, are thrown into engagement and the sprocket wheel, $a^5$, is thereby directly operated by the carrying wheel, and by a connection hereafter fully explained the web of the machine will thereby be driven back to forward position, and I have termed this movement of the web the "retracted" movement of the web. I have shown the shaft, $a^{13}$, which supports the hook, $a^{10}$, extending transversely across the machine, being supported loosely in bearings extending from the side frames B, B. It will be seen that this shaft is located near the center of the machine and in proximity to the carrying wheel, and constitutes a connecting mechanism for the different sets of gear and the controlling levers and locking mechanism. An arm rigidly secured to said shaft indicated by $a^{14}$ (see Fig. 4) is pivotally secured at its free end to a connecting rod, $a^{15}$, which extends forwardly (toward the seat of the operator) and a spring, $a^{16}$, (see Fig. 1) normally holds the shaft, $a^{13}$, in position such that the locking mechanism is in dormant position, so that the foot lever, $a^{12}$, can be operated without interference. Whenever the connecting rod, $a^{15}$, is moved and the shaft, $a^{13}$, rocked in the direction indicated by the arrow (see Fig. 4) the hook will be thrown into operative position and thereby lock the controlling mechanism for the gear $a^3$ $a^4$. The rod, $a^{15}$, is pivotally connected at its forward end to a hand lever, $a^{17}$, which has the usual thumb latch, $a^{18}$, adapted to coöperate with a catch to hold the lever in its operative position. (See Figs. 3 and 7.)

I have heretofore explained that the clutch member,

$a^4$, adapted to be driven by the carrying wheel, and that the sprocket wheel, $a^5$, is operated thereby. I have shown a sprocket chain, $a^{19}$, extending from the sprocket wheel, $a^5$, around the sprocket wheel, $a^{10}$ (see Fig. 1) forming an endless band such that the sprocket wheel, $a^{20}$, is operated directly by the sprocket wheel $a^5$. The sprocket wheel, $a^{20}$, is mounted on a stub shaft, $b$, at the extreme front of the machine, supported loosely in bearings extending from the frame A. There is mounted rigidly on said shaft, $b$, a sprocket wheel, $a^{21}$, in close proximity to the sprocket wheel, $a^{20}$, and the sprocket chain, $a^{22}$, passes around the wheel, $a^{21}$, one end of said chain being secured to one end of the web, $a^{23}$, and the other end of the sprocket chain secured to the other end of said web. From this it is apparent that when the driven gear comprising the clutch members, $a^3$ $a^4$, are thrown into mesh, the web is operated directly by the carrying wheel and is returned to normal position the forward end of the web moves forwardly toward the seat of the operator.

Upon the end of the shaft, $b$, opposite from the sprocket wheels, $a^{20}$ $a^{21}$, there is rigidly secured a pinion $b^1$. A locking pawl, $b^2$, is pivoted to the frame A, and adapted to engage the pinion to prevent the accidental movement of the web. A catch, $b^3$, (see Figs. 3, 7 and 8) is pivoted to the frame of the machine and adapted to coöperate with the end of the thumb latch, $a^{18}$, to hold the hand lever, $a^{17}$ in operative position, and the hand lever during its operating movement engages the cam, $b^5$, through the agency of the pin, $b^4$, to lift the locking pawl out of its engaging position, and thereby release the shaft, $b$. This hand lever, $a^{17}$, controls the driven gear mechanism connecting the carrying wheel with the beater mechanism so that when the hand lever is operated it throws into operative connection this last mentioned gear mechanism with the carrying wheel, and simultaneously with this movement, the locking pawl is thrown out of engagement, so that the web is free to move in unison with the beater mechanism, as will be explained more fully hereafter. A rod, $b^6$, extends along the side of the frame (see Figs. 3 and 7) and a projecting lug, $b^7$, extending therefrom will be struck by the forward end of the web when the web reaches its retracted position, and this rod, $b^6$, being shown connected to the tail of the catch, $b^3$, will thereby operate the catch, $b^3$, and release the controlling lever, $a^{17}$, so that when the web is restored to its normal retracted position the controlling lever will necessarily be thrown to inoperative position by the spring, $a^{16}$.

On one end of the shaft, $a^{13}$ (see Fig. 4) I have shown a cylindrical piece, $b^8$, which has formed on its surface grooves $b^9$. Pins, $b^{11}$, are secured to the sleeve, $b^{13}$, this sleeve fitting over the cylindrical part, $b^8$, so that the pins, $b^{11}$, project within the groove, $b^8$. The lug, $b^{12}$, extending from the sleeve, $b^{10}$, is pivotally connected to the shifter, $b^{21}$, which in turn is pivotally secured to the frame of the machine. At its free end the shifter engages the sleeve formed integral with the gear $b^{14}$, which gear is in mesh with the gear $a^1$. There is formed integral with said gear, $b^{14}$, a clutch member, $b^{16}$, and there is an opposing clutch member, $b^{17}$, formed integral with the sprocket wheel, $b^8$, said sprocket wheel and clutch member being supported on a stub shaft. These clutch members constitute a second set of gear mechanism and connect the carrying wheel with the beater mechanism. This is accomplished by a sprocket chain, $b^{19}$, extending from the sprocket wheel, $b^{18}$, to the sprocket wheel, $b^{20}$, rigidly mounted upon the beater shaft $b^{15}$, consequently whenever the controlling lever, $a^{17}$, is thrown by the operator the driven gear for the beater $b^{22}$ is thrown into direct engagement with the carrying wheel and the beater thereby operated.

The beater $b^{22}$ is connected by a third set of gear mechanism with the web, so that the web is operatively moved by the beater mechanism.

I have shown in Fig. 2 on the end of the shaft, $b^{15}$, opposite that end on which the sprocket wheel, $b^{15}$, is mounted an eccentric, $c^1$, which carries the usual crank pin engaging in a slot formed in the end of the crank arm $c$. The crank arm is fulcrumed at the point, $c^2$, and the free end is also formed with a slot, $c^3$. This crank arm transmits movement from the beater $b^{22}$ direct to a ratchet pawl connection (see Fig. 9) which in turn transmits movement to a beveled gear $c^5$. There is loosely mounted on the stub shaft, $c^4$, a socket, $c^7$, and a rod, $c^{\times}$, is supported by said socket, one end of said rod being loosely inserted in the socket. Near this inserted end of the rod there is rigidly secured a gear, $c^6$, and at the other end of the rod is a worm, $c^9$, the worm being adapted to engage a gear, $c^{10}$, which is rigidly secured to the shaft, $c^{11}$, and this shaft, $c^{11}$, is connected to the web, $a^3$, in any usual manner, as for instance that indicated in my previous patent No. 787,401. I have shown loosely supported on the rod, $c^{\times}$, a guide piece, $c^8$, and there is mechanism connected to this guide piece for raising and lowering the rod $c^{\times}$ to cause the engagement and disengagement of the worm, $c^9$, with the gear $c^{11}$. This gear mechanism constitutes a third set of gear, which I have termed an intermediate gear connecting the beater with the web. By reason of the connecting rod, $c^{13}$, and a controlling lever, $c^{17}$, at the front of the machine the extent of movement transmitted to the pawls by the crank arm, $c$, can be varied and thereby the operative movement of the web can be adjusted. The mechanism for throwing the worm, $c^9$, into and out of gear with the gear, $c^{11}$, is the connecting rod, $c^{15}$, which at its rear end is pivotally connected to a crank $c^{18}$, which crank arm is connected with the guide piece, $c^8$, so that when the rod, $c^{18}$, is operated the worm is raised and lowered for the purpose mentioned. The rod, $c^{15}$, at its forward end is pivotally connected to an arm, $c^{16}$, which projects from the shaft, $a^{13}$.

From this description it will be seen that the mechanism is extremely compact, there being a single connecting shaft extending across the machine carrying the locking mechanism and connected at one end to the set of gear for driving the beater, and at the other end to the gear for driving the web through the agency of the beater, and intermediate of its ends connected to the controlling lever for the first-mentioned gear, and controlling through the lock the controlling mechanism for the gear that drives the web to retracted position.

Having thus described my invention, I claim:

1. In a manure spreader, a main operating device, two sets of driven gear, two controlling devices for said driven gears and located at one end of the machine, a beater located at the other end of the machine, a web driven by one set of said driven gear, a connecting device for the beater and main operating device located near the center of the machine and in proximity to the main operating device, and means operated by the beater for driving the web, a lock for one of said controlling devices controlled by the connecting device, substantially as specified.

2. In a manure spreader, a main operating device, two sets of driven gear and two controlling devices for said gears, a beater connected to one set and a web connected to the other set, gear connecting the beater with the web, and a controlling device for said last-mentioned gear, an intermediate connecting device connected at one end to said last-mentioned controlling device and at the other end connected to the set of gear between the operating device and the beater and intermediate of the ends having a lock adapted to lock one of the first-mentioned controlling devices, substantially as specified.

3. In a manure spreader, the combination of a main operating device, a beater, a set of gear connecting the beater with the main operating device, a controlling lever for said gear, a web, and a set of gear connecting the web with the main operating device and a controlling lever for said second mentioned gear, a third set of gear connecting the beater with the web, a controlling mechanism for said gear, an intermediate connecting device common to said first-mentioned gear and said third-mentioned gear, and a lock controlled by said intermediate connecting device for said second mentioned gear, substantially as specified.

4. In a manure spreader, the combination of a main operating device, a beater and a set of driven gear connecting the beater with the operating device, a web, and a set of gear connecting the web with the main operating device, separate controlling devices for said driven gears, a third set of gear connecting the beater with the web including a ratchet pawl connection, and a controlling mechanism for said third-mentioned gear, an intermediate device common to the first-mentioned gear and the third-mentioned gear, an operating lock for the second mentioned gear operated by the intermediate device, and adjusting mechanism for the pawl ratchet device operated independent of the controlling mechanism, for the purpose specified.

In testimony whereof, I have hereunto set my hand this 16th day of March A. D. 1906.

ELMORE P. ROSS.

Witnesses:
CHAS. I. WELCH,
CLARA GALLAGHER.